(12) United States Patent
Ardash

(10) Patent No.: US 7,594,427 B2
(45) Date of Patent: Sep. 29, 2009

(54) RATE-BASED MONITORING FOR AN ENGINE SYSTEM

(75) Inventor: Dyrr Ardash, Coventry (GB)

(73) Assignee: DENSO Corporation, Kariya (JP)

( * ) Notice: Subject to any disclaimer, the term of this patent is extended or adjusted under 35 U.S.C. 154(b) by 111 days.

(21) Appl. No.: 11/878,873

(22) Filed: Jul. 27, 2007

(65) Prior Publication Data
US 2009/0025458 A1   Jan. 29, 2009

(51) Int. Cl.
  *G01M 3/04* (2006.01)
(52) U.S. Cl. ........................................... 73/49.7
(58) Field of Classification Search .................. 73/49.7, 73/114.38, 114.39, 114.43; 123/516
See application file for complete search history.

(56) References Cited

U.S. PATENT DOCUMENTS

| | | | | |
|---|---|---|---|---|
| 5,509,302 A | * | 4/1996 | Drexel et al. ............. | 73/114.05 |
| 5,577,475 A | * | 11/1996 | De Backer et al. .......... | 123/479 |
| 5,795,997 A | * | 8/1998 | Gittins et al. ............. | 73/117.02 |
| 6,044,314 A | * | 3/2000 | Cook et al. ................ | 701/31 |
| 6,260,410 B1 | * | 7/2001 | Cook et al. ............... | 73/114.39 |
| 6,282,945 B1 | * | 9/2001 | Weldon et al. ............. | 73/40 |
| 6,446,492 B2 | * | 9/2002 | Weldon et al. ............. | 73/49.2 |
| 6,631,634 B2 | * | 10/2003 | Cook et al. ............... | 73/114.39 |
| 6,658,925 B2 | * | 12/2003 | Cook et al. ............... | 73/114.39 |
| 6,769,290 B2 | * | 8/2004 | Fabre ..................... | 73/49.7 |
| 7,272,488 B2 | * | 9/2007 | Hayashi et al. ............. | 701/114 |
| 7,363,183 B2 | * | 4/2008 | Gelmetti et al. ............ | 702/100 |
| 7,448,257 B2 | * | 11/2008 | Kimura .................... | 73/49.7 |
| 7,472,582 B2 | * | 1/2009 | Ito et al. ................. | 73/49.7 |

* cited by examiner

*Primary Examiner*—Lisa M Caputo
*Assistant Examiner*—Freddie Kirkland, III
(74) *Attorney, Agent, or Firm*—Nixon & Vanderhye P.C.

(57) ABSTRACT

Rate based monitoring includes performing test cycles on a monitored system when predetermined conditions are met. Completion of a test cycle is determined by timing a period that is at least as long as the longer of a time required to detect a correct operation of the monitored system and a time to detect a malfunction of the monitored system, the timing being reset if one or more of the predetermined conditions cease to be met. A count is kept of completed test cycles.

12 Claims, 5 Drawing Sheets

RATE-BASED MONITORING FOR AN ENGINE SYSTEM

BACKGROUND

1. Field

This invention relates to the rate based monitoring, for example for leak check monitoring for an internal combustion engine.

2. Background

Legislation relating to emissions control for motor vehicles such as automobiles includes requirements that various tests are performed on internal combustion engines and the systems associated therewith to monitor the correct operation of those engines and associated systems with the aim of providing a fault indication when a malfunction occurs that could lead to undesired emissions. A fault indication can be in the form, for example of a malfunction indicator lamp (MIL) being illuminated in the vehicle.

For some tests to be performed, the regulation specifies that tests should be performed at a given rate. The given rate is determined in terms of a numerator that is calculated as a measure of the number of times a vehicle has been operated such that all monitoring conditions necessary for a specific monitor to detect a malfunction have been encountered divided by a denominator that is representative of the number of times that a standard driving cycle having predetermined operating characteristics (also referred to as a "normal" driving cycle) has been performed.

Where a judgment of normal operation (i.e. non-failure operation) and a judgment of failure operation can be performed at a specific given time, then a rate based monitoring (RBM) numerator count can be updated when either failure or normal judgment is completed.

However if a timing of a judgment of normal operation and a judgment of a failure operation cannot be performed at a given timing, or if they take different times from starting a test procedure or if there are statistical variations that means that there is a spread of times at which judgment results are available, this methodology cannot be used. For example, in a conventional system, a judgment of normal operation may be made at a timing where it is not possible to detect failure with failed system, whereby an RBM numerator count cannot be updated.

Exemplary, non-limiting embodiments of the present invention seek to provide a reliable system for updating the RBM numerator count.

SUMMARY

An embodiment of the invention can provide an engine management system for an internal combustion engine, the engine management system comprising a rate based monitor operable to perform a test cycle on a monitored system when the internal combustion engine is operating within predetermined parameters. The rate based monitor includes a rate counter for counting a number of times a test cycle is completed. The rate based monitor also includes a timer for defining a test cycle completion timing. The timer (e.g., a count up timer, a count down timer, a cyclic timer, etc.) starts timing when the test cycle starts and times out after a period that is at least as long as the longer of a time required to detect a correct operation of the monitored system and a time to detect a malfunction of the monitored system. The timer is reset in response to detection operation of the monitored system outside of the predetermined parameters during the test cycle. The rate counter is updated in response to the timer timing out.

Another aspect of the invention provides a rate based monitoring method that performs test cycles on a monitored system, wherein a test cycle is completed when a malfunction of the monitored system could have been detected irrespective of whether a malfunction is detected and the test cycle are only performed when predetermined operation conditions are met. The method includes maintaining a rate counter dependent on a number of times a completed test cycle is performed. The method also includes timing test cycle completion, including starting timing when the test cycle starts and timing out after a predetermined period sufficient to detect a malfunction of the monitored system irrespective of whether a malfunction is detected. The timing is reset in response to detection of at least one of the predetermined operation conditions ceasing to be met during the test cycle. The counter value in the rate counter is updated in response to timing out on completion of a test cycle.

An embodiment of the invention provides for a leak check system and method, wherein, where a detection timing between failure and normal is different, a rate based numerator is updated when sufficient monitor execution time has completed to ensure that the failure can be detected regardless of actual system condition (failure condition or normal condition). The update can be performed when failure can have been detected regardless of whether a normal or a failure condition of operation is detected.

In an embodiment, in order to wait until a timing at which a failure can be detected, a reference counter can be used as the timer. The timer can be set when a monitor cycle is initiated and can be reset if the monitor cycle needs to be aborted. A monitor cycle may be aborted, for example if one or more operating parameters for the system being monitored fall outside predetermined parameters that are required for the test to be performed.

BRIEF DESCRIPTION OF THE FIGURES

The above and other aspects, features and advantages of exemplary, non-limiting embodiments of the present invention will now be described by way of example only with reference to the accompanying drawings.

Figure 1:
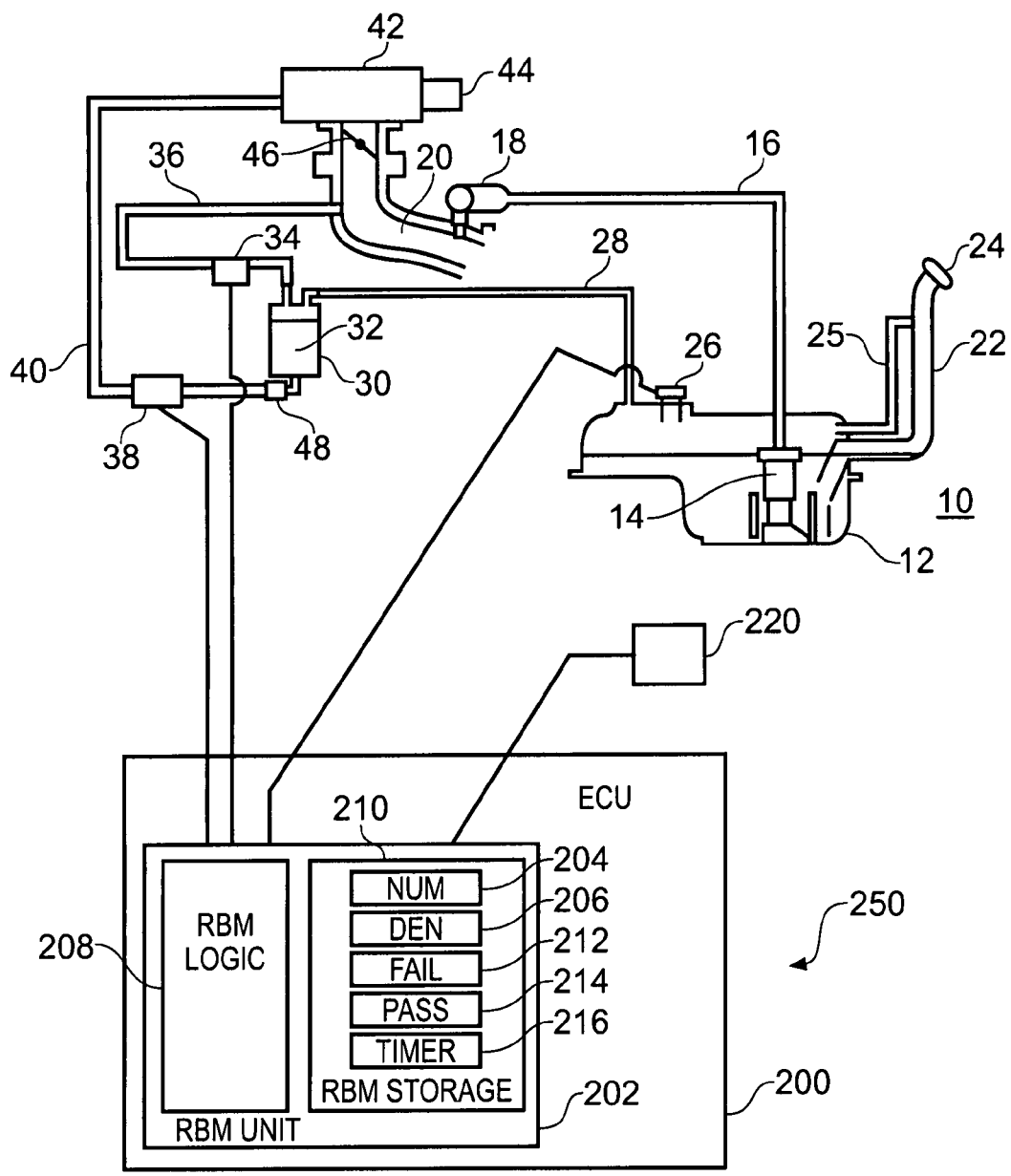
FIG. 1 is a schematic representation of a fuel system including a fuel tank and an engine control unit of a vehicle.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Example embodiments of the present invention are described in which test cycles are performed on a monitored system when predetermined conditions are met. A test cycle is completed when a correct operation or malfunction of the monitored system could have been detected irrespective of whether a malfunction or correct operation is detected. Completion of a test cycle is timed from the start of a cycle until a timing when the correct operation or malfunction of the monitored system could have been detected irrespective of whether a malfunction or correct operation is detected, the timing being reset if one or more of the predetermined conditions cease to be met. A count is kept of completed test cycles.

A particular embodiment described herein relates to a leak check on an evaporative system, for example a fuel system that includes a fuel tank. In an internal combustion engine system with a fuel tank containing a volatile fuel, potential evaporative emissions from the piping and connections of the evaporative system are monitored to control unwanted emissions of fuel components. Regulations specify that emissions over a given level should be identified as a failure condition that leads to the malfunction indicator lamp (MIL) being turned on in the vehicle. For example, in at least one regulation for vehicles manufactured in and after the model year 2000, a leak quantity representative of a leak exceeding that to be expected from a 0.5 mm diameter orifice is to be notified as a failure of the leak test.

These regulations for the leak tests also specify that the test rate is determined in terms of a numerator that records the number of times a vehicle has been operated such that all monitoring conditions necessary for a specific monitor to detect a malfunction have been encountered. A corresponding denominator records the number of times that a predetermined driving cycle has been performed.

Various detection approaches can be used to provide a leak test, including a negative pressure detection method and a positive pressure detection method.

The present example of the invention uses a negative pressure detection method, an example of which will be described with reference to FIGS. 1 to 4.

FIG. 1 is a schematic representation of a fuel system 10 comprising a fuel tank 12.

A fuel pump 14 is connected via a fuel supply line 16 to one or more injectors 18 for injecting fuel, in the present instance, into an inlet manifold 20 of an internal combustion engine.

Fuel (e.g., gasoline) can be added to the fuel tank 12 via a fuel filler duct 22 when a filler cap 24 is open. A breather pipe 25 extends between the fuel tank 12 and the inside of the fuel filler duct 22, at an upper end thereof, for vapor and air to escape from the tank 12 as fuel is added to the tank 12 via the fuel filler duct 22. Before and after adding fuel to the tank 12, the fuel filler duct 22, and the breather pipe 25, can be sealed by closing the fuel filler cap 24.

The fuel tank 12 is provided with a pressure sensor 26 for monitoring pressure within the tank 12. The pressure within the tank can vary over time in accordance with varying operating conditions, for example as a result of the degree of evaporation of the fuel according to whether fuel is agitated due to movement of the vehicle, ambient and fuel tank temperature, etc.

The fuel tank 12 is also provided with a vapor path 28, here in the form of a vapor pipe, that that is connected to a canister 30 that contains charcoal 32. The charcoal is used to collect fuel vapor in the vapor path 28. The vapor in the charcoal 32 of the canister 30 can be purged by opening a purge control valve 34 (also described herein as a purge valve) in a purge path 36, here in the form of a purge pipe, that connects the canister 30 to the inlet manifold 20 when the purge valve 34 is open. When the purge valve 34 is closed, the canister is isolated from the inlet manifold 20.

When the internal combustion engine is running, the inlet manifold typically has a lower pressure than ambient (atmospheric) pressure, whereby opening the purge valve 34 draws air from inside the tank 12, the vapor path 28 and the canister 30 and this purges at least part of the vapor in the charcoal 32 of the canister 30. When the purge valve 34 is open, an air path shutoff valve 38 (also described herein as the air path valve, or the canister close valve) in an air path 40, here in the form of an air pipe, is closed to isolate the inside, or interior, of the tank 12, the vapor pipe 28 and the canister 30 from ambient air pressure.

The air path 40 is connected to the clean side of the air cleaner 42 which is located between the air inlet 44 for the internal combustion engine and the throttle valve 46 upstream of the inlet manifold 20.

The air path shutoff valve 38 in the air path 40 can be opened when the purge valve 34 is closed in order to return the inside of the tank 12, the vapor pipe 28 and the canister 30 to ambient pressure. An air path check valve 48 is a one-way valve provided in the air path 40 to prevent an overpressure higher than ambient pressure in the inside of the tank 12, the vapor pipe 28 and the canister 30 (for example if the interior of the tank is heated such that the fuel vaporization increases) causing vapor to pass from the canister directly into the atmosphere resulting in unwanted pollution when the air path valve 38 is opened.

FIG. 1 also illustrates a schematic block representation of an engine management system 250 that including an engine control unit (ECU) 200. The ECU 200 can include one or more microprocessors and/or microcontrollers. In the present example, the engine control unit 200 of the engine management system is responsive to various sensors, including the pressure sensor 26, and is operable to control various systems including the purge valve 34, the air path valve 38 and the malfunction indicator lamp (MIL) 220. It will be appreciated that the ECU is connected to many vehicle systems in addition to those shown in FIG. 1 for controlling many aspects of the operation of the engine and the vehicle.

In the present example, the engine control unit 200 includes various logical units, including a rate based monitor (RBM) unit 202. The RBM unit also includes RBM logic 208 and RBM storage 210 (which can include volatile and non-volatile storage) for implementing a control method described hereinafter for performing an example negative pressure leak detection method and for verifying the correct operation thereof. The RBM storage 210 includes an RBM numerator counter 204 and an RBM denominator counter 206. The RBM numerator counter 204 and an RBM denominator counter 206 can be implemented in non-volatile storage (or volatile storage with a back-up power source) so that the values held thereby are maintained, even if the vehicle battery is disconnected. Various other data can be stored in the RBM storage 210, including a leak test failure counter 212 and a leak test pass counter 214. An RBM timer 216 can also be implemented in the RBM storage 210. It should, however, be appreciated that although the engine control unit is illustrated as a block in FIG. 1, and although the engine control unit can be implemented as a single unit providing a centralized control system, the term "engine control unit" is intended to also encompass a distributed system with a plurality of separate functional units (or sub-units) having responsibility for various control functions. For example, the RBM unit 208 may be configured as a separate unit.

An example negative pressure leak detection method is described hereinafter with reference to the example fuel system illustrated in FIG. 1. The example negative pressure leak detection method provides that, when the fuel tank 12 is sealed off at a negative pressure condition, a leak in the evaporative system can be detected by checking a variation in pressure at the pressure sensor 26.

When the fuel tank 12 is set to a negative pressure, the quantity of vapor produced increases the pressure in the tank. This can be measured and compared to a given reference value. Once a stable condition is reached, a leak through an orifice of greater than a predetermined size can be detected if the pressure rise over a given period is greater than a given amount.

An example negative pressure detection method can include a step of closing the air path shutoff valve 38. The RBM logic 208 causes the purge valve 34 to open to connect the negative pressure in the intake manifold 20 to the inside of the fuel tank 12 in order to pull down the pressure in the fuel tank 12. The RBM logic 208 then causes the purge valve 34 to shut off, whereby the pressure in the fuel tank 12 should be maintained. If a return to ambient pressure is observed within a period of time, this is indicative of a leak. The rate of return to atmospheric pressure, or the time taken for this, is indicative of the size of the leak. Accordingly, a method of judging the size of any leak is to measure the pressure at one or more predetermined times after the purge control valve 34 has been shut off.

Figure 2:
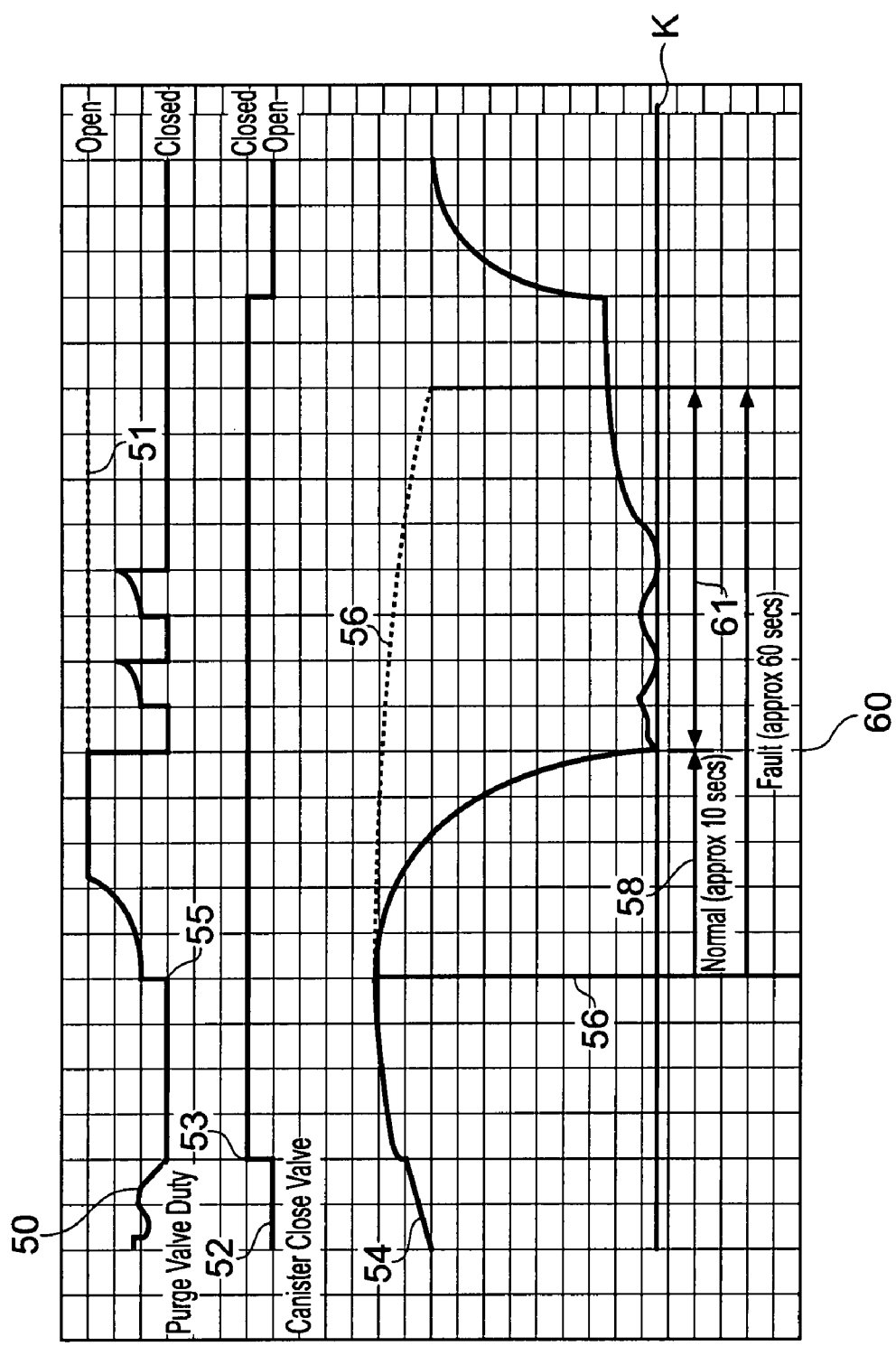
FIG. 2 is a diagrammatic representation of the operation of a rate based monitor system.

FIG. 2 is a timing diagram illustrating this example of the negative pressure detection method in more detail. FIG. 2 includes a purge valve 34 duty trace 50, an air path shutoff valve (canister close valve) 38 duty trace 52 and a pressure trace 54 representative of the pressure measured by the pressure sensor 26. At the left hand end of the purge valve duty trace 50 and the air path shutoff valve duty trace 52, there is a delay between the RBM logic 208 closing the air path valve 38 at 53 and opening the purge valve 34 at 55. This represents a time for stabilizing the pressure in the fuel system, due, for example, to evaporation of fuel following closing of the air path valve 38. For example due to evaporation of fuel in the fuel tank in a sealed system, the pressure measured at the pressure sensor 26 in the fuel tank 12 may rise so that it exceeds ambient pressure. This rise in pressure is indicated in the pressure trace 54 to the left of the line 56, which coincides with period in which the purge valve 34 is shown as being closed to the left of the point 55 in the purge valve trace 50 in FIG. 2.

When stabilization of the pressure is detected by the pressure sensor 26, the RBM logic 208 responds thereto by opening the purge valve 34, which, as shown in FIG. 2, represents the start of a negative pressure introduction, or pull down, period 58. As can be seen from the pressure trace 54 in FIG. 2, in a normally operating system, the pressure detected at the pressure sensor 26 will drop rapidly, whereby after a relatively short period, for example of the order of 10 seconds, a threshold pressure K will be reached. When the threshold pressure K (see FIG. 3) is detected by the pressure sensor 26, e.g., at a timing 60 shown in FIG. 2, the RBM logic 208 responds thereto by closing the purge valve 34. As mentioned above, it should be noted that there can be a spread of times over which the threshold pressure K will be reached in different vehicles and on different times of operation in a single vehicle.

When the RBM logic 208 causes the purge control valve to close, this represents the end of the negative pressure introduction period 58 and the start of a judgment period 61. The pressure can be recorded at this at this time by the RBM logic 208 in the RBM storage 210. At least at the end of the judgment period 61 at a specific elapsed time, the pressure is measured once more, and is compared to a reference value held in the RBM storage 210. If the pressure is below a given threshold at that time, then the evaporative system can be considered to have passed the leak test and this result can be stored in the pass counter 214 in the RBM storage 210. If the pressure is above the given threshold at that time, then the evaporative system can be said to have failed the leak test and this can be recorded in the failure counter 212 in the RBM storage 210.

It should be noted that a slight rise in pressure can be experienced at the start of the judgment period 61, even in a normally operating fuel system without a leak, due to further evaporation. Accordingly, optionally, if a rise of at least a predetermined amount is detected by the pressure sensor at a timing of a couple of seconds, for example the left-side of the judgement period 61 illustrated in FIG. 2, then the RBM logic 208 can be operable to re-open the purge valve 34, as illustrated in the purge valve control trace 50 in FIG. 2. When the pressure sensor 26 once more detects the threshold pressure K, then the RBM logic 208 re-closes the purge valve 34, as shown in the purge valve duty trace 50. In this case, the second closing of the purge valve would be taken as the start of the judgment period 61. As can be seen in FIG. 2, this cycle of re-opening and then re-closing the purge valve may optionally be repeated if the pressure values detected by the pressure sensor 26 are not substantially stable, to reset the start of the judgment period 61.

FIG. 2 also illustrates with a dotted line at 56 in the pressure trace 54 a fault condition in which the pressure detected by the pressure sensor 26 does not reduce substantially in response to the closure of the purge valve 34. This could represent a situation such as, for example, that the fuel filler cap 24 has not been closed properly. As indicated by the dotted line 51 in the purge valve trace 50, the RBM logic 208 will keep the purge valve 34 open in such a situation to continue to attempt to pull down the pressure in the fuel tank 12. Such a situation is an example of a failure mode in which a failure may take longer to establish reliably than a normal operating mode.

In an example embodiment of the invention, if the threshold pressure K is not detected by a predetermined timing following the start of the test cycle, a timeout failure can be recorded by the RBM logic 208 in the failure counter 212 in the RBM storage 210.

Figure 3:
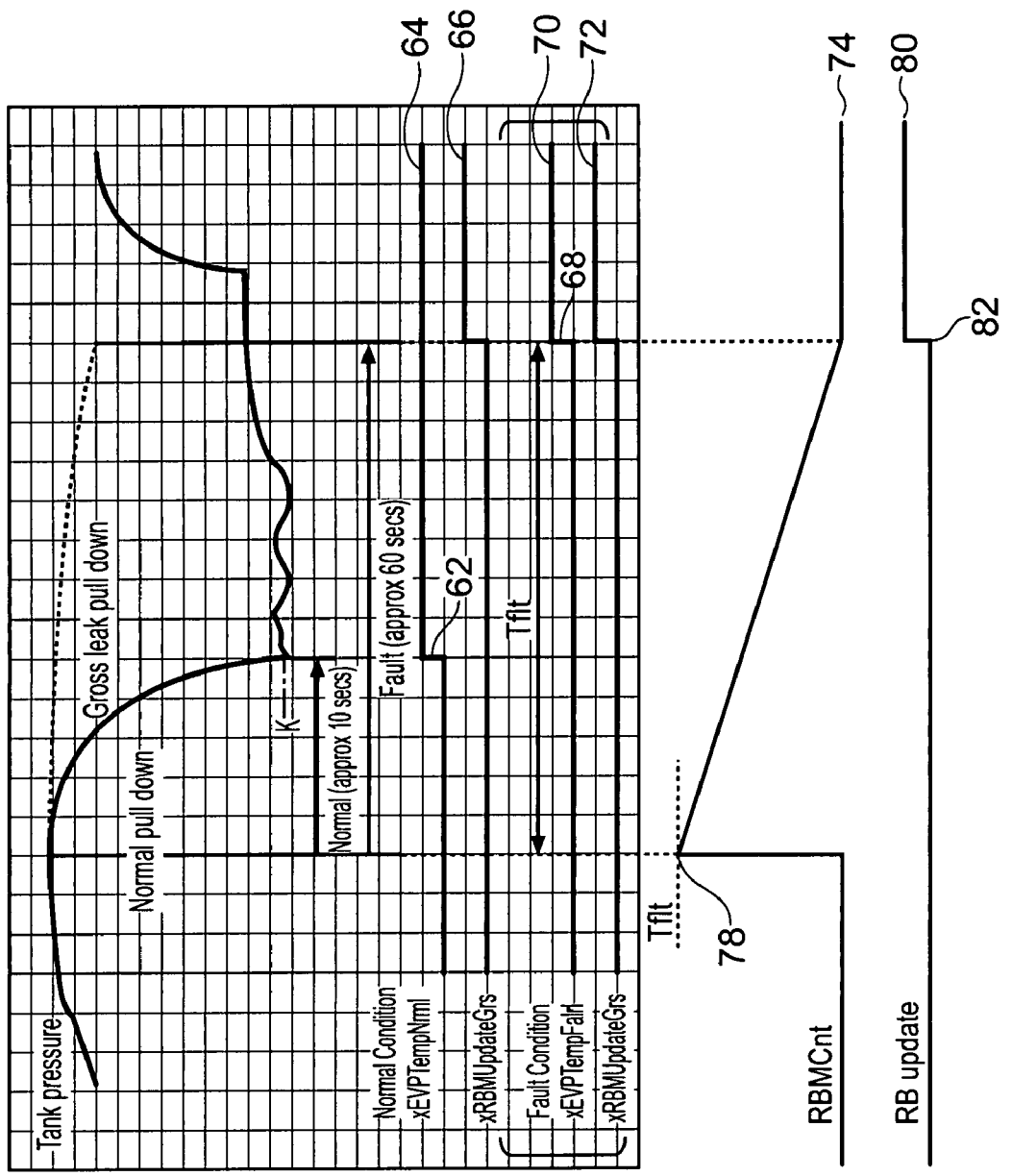
FIG. 3 is a diagrammatic illustration of the use of a timer with the rate based monitor system.

FIG. 3 illustrates the operation of an RBM timer 216. The timer 216 can be implemented as a counter that is controlled by the RBM logic 208. In the example shown in FIG. 3, the RBM logic 208 starts the timer 216 when the purge valve 34 is opened at 58 in FIG. 2, and then the timer 216 counts until a predetermined count representative of a period that is at least as long as the longer of a time required to detect a correct operation of the monitored system and a time to detect a malfunction of the monitored system, the monitored system in this case being the leak check system.

FIG. 3 also shows that correct operation of the monitored system can be recorded at 62 in the pass counter 214 in the RBM storage 210 as indicated by the step 62 in the trace 64 when the pressure K is detected by the pressure sensor 26. The step in the trace 66 represents the resetting of the timer 216 when the timer 216 reaches the predetermined count and times out.

FIG. 3 also shows that a malfunction of the monitored system can be recorded at 68 in the failure counter 212 in the RBM storage 210 as indicated by the step 68 in the trace 70 when the timeout time is reached and the pressure value K has not been detected by the pressure sensor 26. The step in the trace 72 represents the resetting of the timer 216 when the timer 216 reaches the predetermined count and times out.

Trace 74 represents the timer 216 counting from a start count value at 76 to as predetermined count value at 78. As shown in FIG. 3, the timer 216 is represented as count down timer, but it could equally be implemented as a count up timer. It is assumed in this example that the timer 216 is implemented as a count down timer. Trace 80 represents that the RBM logic 208 causes a signal at 82 to update the numerator counter 204.

As described in FIG. 3, the start of the test cycle is determined to be the opening of the purge valve. However, in another example another start point could be used, for example the closing of the air path valve 38 at 53 in FIG. 2.

As mentioned above, the test cycle for testing the monitored system can only be performed when the engine is operating within predetermined operating conditions. Accordingly, before a test cycle can start, the engine needs to be operating within the predetermined operating parameters, and if at any time during the test cycle the engine ceases to operate within those operating parameters, the test cycle is stopped and the timer 216 is reset.

Figure 4:
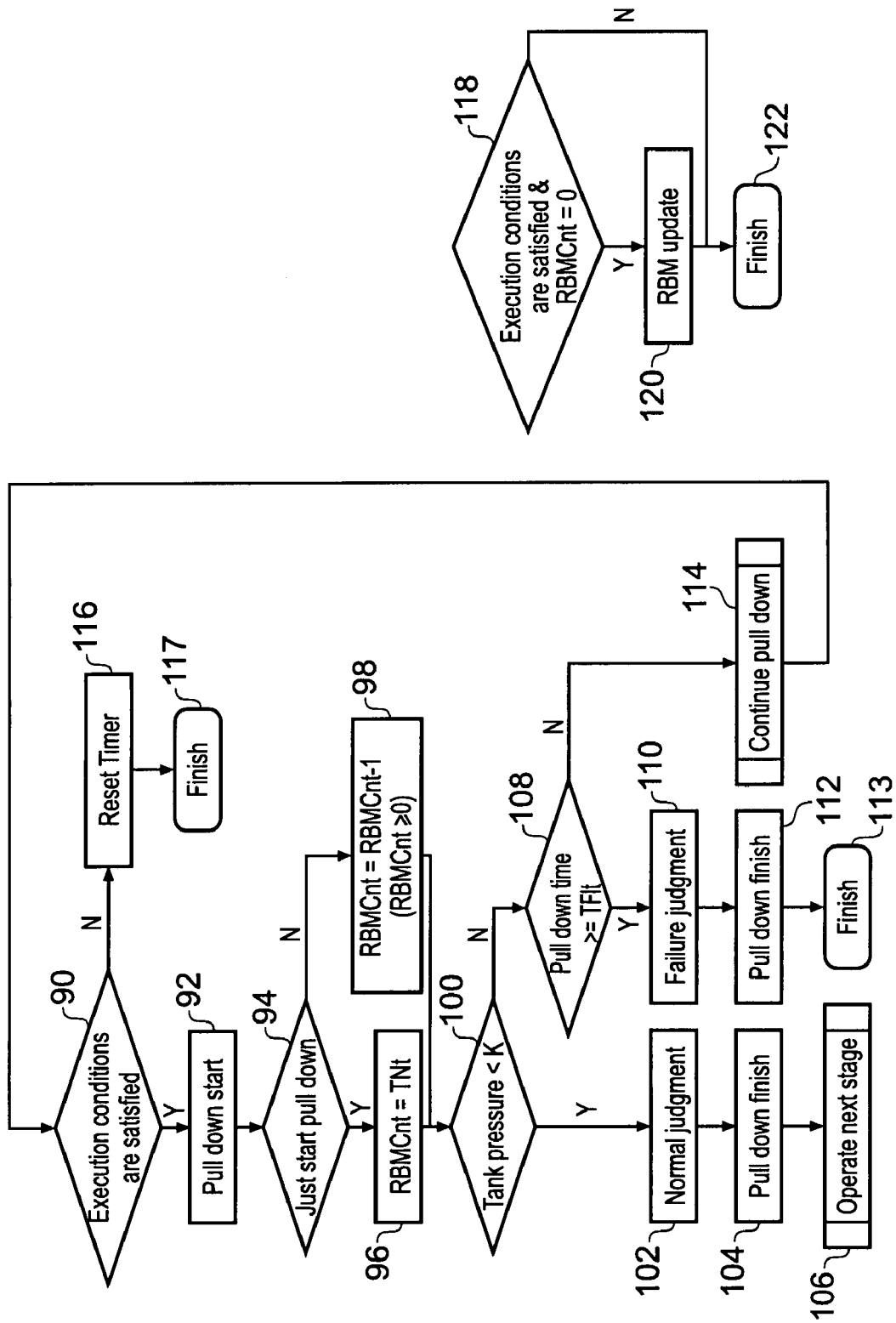
FIG. 4 is a flow diagram illustrating the operation of the rate based monitor system.

FIG. 4 is a flow diagram illustrating the operation of an example embodiment of the invention. As mentioned above, the test cycle for testing the monitored system can only be performed when the engine is operating within predetermined parameters. These parameters typically are representative of a cruise mode of operation when the vehicle and/or the engine are operating within a predetermined speed range, etc. Examples of the parameters can include one or more of: the engine airflow, or engine load, being within predetermined limits; the vehicle speed being between predetermined limits; the manifold pressure relative to ambient (atmospheric) pressure being above a predetermined threshold; the coolant and ambient temperatures being between predetermined limits, the engine must have been running for at least a predetermined time; the purge valve must have been operated at least a predetermined number of times, etc.

Accordingly, at step 90, a determination is made as to whether the engine is operating within the predetermined operating parameters. That is, are the test execution conditions satisfied.

If it is determined that the test execution conditions are satisfied at step 90, then at step 92 the pull down is started by opening the purge valve 34.

If at step 94 the pull down has just started (i.e. the purge valve 34 has just been opened), then at step 96 then the RBM logic 208 sets the timer 216 to a threshold time value. Otherwise, the RBM logic 208 decrements the count of the threshold counter at step 98.

Following step 96 or step 98, then at step 100 the pressure sensor 216 tests whether the tank pressure is less than the threshold pressure K.

If the RBM logic 208 determines in step 100 that the threshold pressure measured by the pressure sensor 216 is less than K, then the operation of the leak monitor system is judged to be normal at step 102 and at step 104 the RBM logic 208 terminates pull down by closing the purge valve 34 and the next stage of the leak monitor test cycle is performed at step 106.

If the RBM logic 208 determines in step 100 that the threshold pressure is not less than K, then it makes determination at step 108 as to whether the pull down time is greater than or equal to the threshold timer value.

If the RBM logic 208 determines in step 108 that the pull down time is greater than or equal to the threshold timer value, the operation of the leak monitor system is judged to be a failure at step 110 and at step 112 the RBM logic 208 terminates pull down by closing the purge valve 34 and the process finishes at step 113.

If the RBM logic 208 determines in step 108 that the pull down time is not greater than or equal to the threshold timer value, then at step 114 the RBM logic 208 continues the pull down and control passes back to step 90.

If at any time during the operation of the leak monitor system the RBM logic 208 determines that the execution conditions are not satisfied in step 90, then in step 116 the RBM logic 208 resets the timer 216 and the test cycle is terminated in step 117.

Also, in step 98 the RBM logic 208 steps the timer 216 to zero, then if it is determined in step 118 that the execution parameters are still met, then the RBM logic 208 updates (e.g., increments) the numerator counter 202 in step 120 and in step 122 the process finishes.

The RBM logic 210 is also operable to monitor the operating conditions of a drive cycle to determine whether a set of drive cycle characteristics are met to be able to increment the denominator count 206 at the end of a drive cycle. The drive cycle characteristics can be those defined by legislation to be representative of a typical drive cycle, and can include a required number of different drive phases at different speed, engine speeds etc. by monitoring various parameters monitored by the ECU 200. If, at the end of a drive cycle, the RBM logic 210 determines that the drive cycle meets the set of drive cycle characteristics, the denominator counter 206 is updated, e.g., by being incremented.

Figure 5:
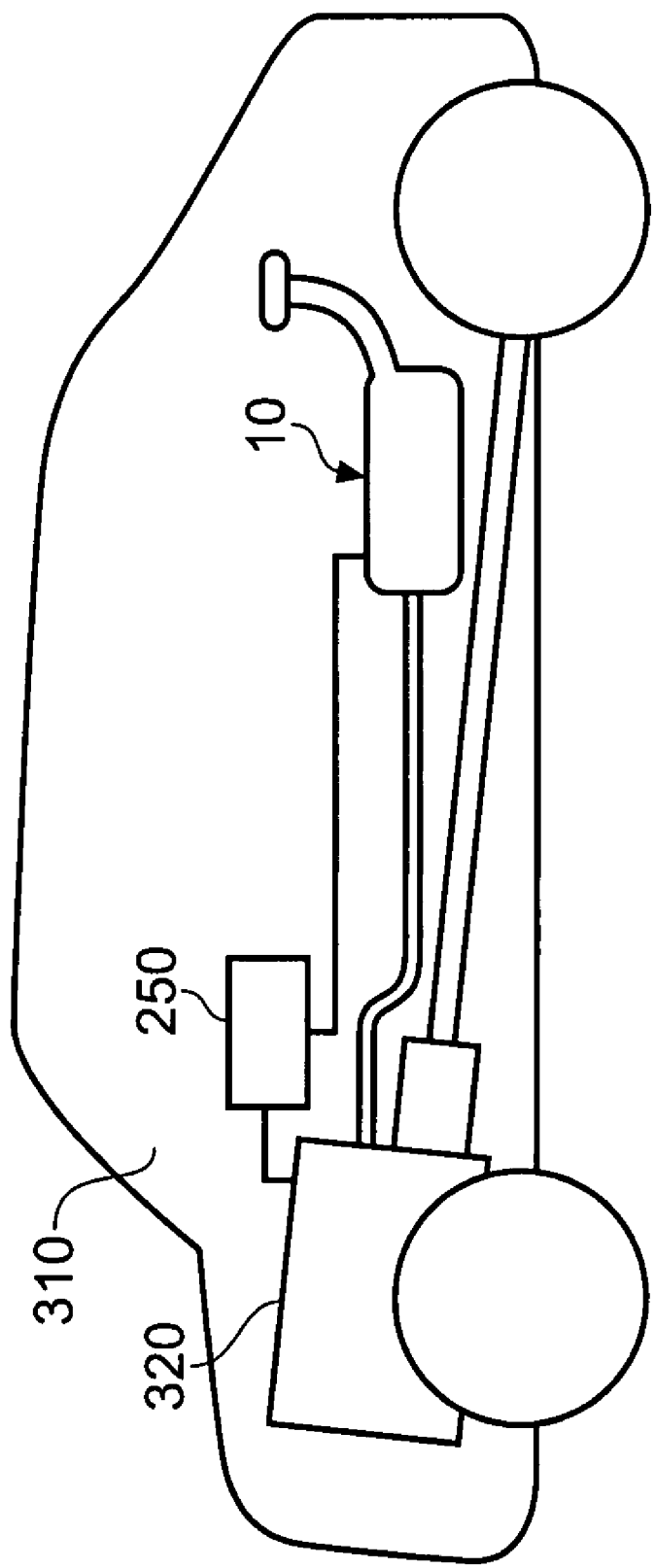
FIG. 5 is a schematic representation of a vehicle.

FIG. 5 is a schematic representation of a vehicle 300 including an internal combustion engine 320 and the fuel system 10 and engine management system system 250 of FIG. 1.

There has been described a rate based monitoring system and method in which test cycles are performed on a monitored system when predetermined conditions are met. A test cycle is completed when a malfunction of the monitored system could have been detected irrespective of whether a malfunction is detected. Completion of a test cycle is timed from the start of a cycle when a malfunction of the monitored system could have been detected, the timing being reset if one or more of the predetermined conditions cease to be met. A count is kept of completed test cycles.

In an embodiment, in order to wait until a timing at which a failure can be detected, a reference counter is used as a timer. The timer can be set when a monitor cycle is initiated and can be reset if the monitor cycle needs to be aborted. A monitor cycle may be aborted, for example if one or more operating parameters for the system being monitored fall outside predetermined parameters that are required for the test to be performed.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An engine management system comprising:
 a rate based monitor operable to perform test cycles on a monitored system when predetermined conditions are met, a test cycle being completed when a correct operation or malfunction of the monitored system could have been detected irrespective of whether a malfunction or correct operation is detected, the rate based monitor comprising:

a counter for counting a number of times a completed test cycle is performed; and a timer operable to define a test cycle completion timing, the timer timing a test cycle from a start of a test cycle until a timing when the correct operation or malfunction of the monitored system could have been detected irrespective of whether a malfunction or correct operation is detected, the timer being reset it one or more of the predetermined conditions cease to be met;

wherein the counter is updated in response to the timer timing out on completion of a test cycle;

the monitored system is a fuel system that includes a fuel tank, and the test cycle is operable to rest for a leak; and the rate based monitor is operable to effect a test cycle that includes:

closing an air path shutoff valve in an air path from an air intake to the fuel system;

opening a purge valve in a purge path from an engine intake manifold to the fuel system;

closing the purge valve when a predetermined pressure is detected in the fuel system; and performing pressure computations based on measured pressures in the fuel system to detect a leak, a failure being notified in response to predetermined pressure computation results.

2. The engine management system of claim 1, wherein the rate based monitor is operable to perform the pressure computations based on measured pressures in the fuel system following a settling period following closing of the purge valve when a predetermined pressure is detected in the fuel system.

3. The engine management system of claim 2, wherein the rate based monitor is operable, in response to detection of a rise in pressure greater than a threshold value after a predetermined time, to reopen the purge valve until the predetermined pressure is once more detected in the fuel system, and then to perform the pressure computations based on measured pressures in the fuel system following a further settling period following re-closing of the purge valve when the predetermined pressure is detected in the fuel system.

4. The engine management system of claim 1, wherein the rate based monitor is operable, in response to detection of at least one of the predetermined conditions ceasing to be met during the test cycle, to stop the test cycle, to re-close the purge valve if open and to re-open the air path shutoff valve.

5. The engine management system of claim 4, wherein the rate based monitor is operable, at least a predetermined time following the stopping of a test cycle, to restart a test cycle when the predetermined conditions are again met.

6. An engine management system comprising:

a rate based monitor operable to perform test cycles on a monitored system when predetermined conditions are met, a test cycle being completed when a correct operation or malfunction of the monitored system could have been detected irrespective of whether a malfunction or correct operation is detected, the rate based monitor comprising:

a counter for counting a number of times a completed test cycle is performed; and a timer operable to define a test cycle completion timing, the timer timing a test cycle from a start of a test cycle until a timing when the correct operation or malfunction of the monitored system could have been detected irrespective of whether a malfunction or correct operation is detected, the timer being reset if one or more of the predetermined conditions cease to be met;

wherein the counter is updated in response to the timer timing out on completion of a test cycle; and a count value in the counter forms a numerator of a rate based monitor ratio, a further count being maintained as a denominator of the ratio, the further count being a count of a number of times a predetermined drive cycle is completed.

7. An engine management rate based monitoring method for performing test cycles on a monitored system, the test cycle only being performed when predetermined conditions are met, the method comprising:

maintaining a count of a number of times a completed test cycle is performed;

timing completion of a test cycle by timing a period that is at least as long as the longer of a time required to detect a correct operation of the monitored system and a time to detect a malfunction of the monitored system, the timing being reset if one or more of the predetermined conditions cease to be met; and updating the count on completion of the timed period;

wherein the monitored system is a fuel system that includes a fuel tank, and the test cycle is operable to test for a leak; and a test cycle includes:

closing an air path shutoff valve in an air path from an air intake to the fuel system;

opening a purge valve in a purge path from an engine intake manifold to the fuel system;

closing the purge valve when a predetermined pressure is detected in the fuel system; and performing pressure computations based on measured pressures in the fuel system to detect a leak, a failure being notified in response to predetermined pressure computation results.

8. The method of claim 7, further comprising performing the pressure computations based on measured pressures in the fuel system following a settling period following closing of the purge valve when a predetermined pressure is detected in the fuel system.

9. The method of claim 8, further comprising, in response to detection of a rise in pressure greater than a threshold value after a predetermined time, reopening the purge valve until the predetermined pressure is once more detected in the fuel system, and then performing the pressure computations based on measured pressures in the fuel system following a further settling period following re-closing of the purge valve when the predetermined pressure is detected in the fuel system.

10. The method of claim 7, further comprising, in response to detection of at least one of the predetermined operation conditions ceasing to be met during the test cycle, stopping the test cycle, re-closing the purge valve if open and re-opening the air path shutoff valve.

11. The method of claim 10, further comprising, at least a predetermined time following the stopping of a test cycle, restarting a test cycle when the predetermined operating conditions are again met.

12. An engine management rate based monitoring method for performing test cycles on a monitored system, the test cycle only being performed when predetermined conditions are met, the method comprising:

maintaining a count of a number of times a completed test cycle is performed;

timing completion of a test cycle by timing a period that is at least as long as the longer of a time required to detect a correct operation of the monitored system and a time to detect a malfunction of the monitored system, the timing being reset if one or more of the predetermined conditions cease to be met; and updating the count on completion of the timed period;

wherein the count forms a numerator of a rate based monitor ratio, a further count being maintained as a denominator of the ratio, the further count being a count of a number of times a predetermined drive cycle is completed.

* * * * *